(12) United States Patent
Bouldin

(10) Patent No.: US 8,025,141 B1
(45) Date of Patent: Sep. 27, 2011

(54) CONTOUR TRIMMER FOR POTTED PLANTS

(75) Inventor: E. Lloyd Bouldin, McMinnville, TN (US)

(73) Assignee: Bouldin Corporation, McMinnville, TN (US)

( * ) Notice: Subject to any disclaimer, the term of this patent is extended or adjusted under 35 U.S.C. 154(b) by 476 days.

(21) Appl. No.: 12/342,362

(22) Filed: Dec. 23, 2008

(51) Int. Cl.
*B65G 15/64* (2006.01)

(52) U.S. Cl. .................. 198/345.1; 198/343.1; 198/617; 198/836.3

(58) Field of Classification Search ............... 198/343.1, 198/345.3, 375, 474.1, 836.1, 836.3, 617; 53/255
See application file for complete search history.

(56) References Cited

U.S. PATENT DOCUMENTS

| | | | |
|---|---|---|---|
| 1,757,548 A | 5/1930 | Schissler | |
| 2,156,020 A * | 4/1939 | Lathrop | 198/836.3 |
| 2,229,605 A | 1/1941 | Snyder et al. | |
| 2,577,341 A * | 12/1951 | Magnusson | 198/379 |
| 2,681,758 A * | 6/1954 | Lipson | 53/70 |
| 3,032,331 A | 5/1962 | Doty et al. | |
| 3,487,614 A | 1/1970 | Uhor | |
| 3,527,336 A | 9/1970 | Johnston | |
| 3,913,304 A | 10/1975 | Jodoin | |
| 4,302,922 A | 12/1981 | Guerndt, Jr. et al. | |
| 4,383,401 A | 5/1983 | Lessard et al. | |
| 4,455,815 A | 6/1984 | Grant | |
| 4,777,787 A | 10/1988 | Warren | |
| 4,970,791 A | 11/1990 | Vergara | |
| 5,040,661 A * | 8/1991 | Yasuda et al. | 198/395 |
| 5,211,280 A * | 5/1993 | Houde | 198/836.3 |
| 5,322,160 A * | 6/1994 | Markiewicz et al. | 198/836.3 |
| 5,353,910 A | 10/1994 | Harris et al. | |
| 5,927,480 A * | 7/1999 | McCaffrey et al. | 198/836.3 |
| 6,129,099 A | 10/2000 | Foster et al. | |
| 6,151,876 A | 11/2000 | Van Der Burg | |
| 6,152,293 A * | 11/2000 | Ballos, III | 198/836.3 |
| 6,231,036 B1 | 5/2001 | Johnson et al. | |
| 6,305,528 B1 | 10/2001 | Leonard | |
| 6,311,746 B1 | 11/2001 | Halvorson et al. | |
| 6,523,823 B1 * | 2/2003 | Bakoledis | 271/223 |
| 6,742,981 B2 * | 6/2004 | Harada et al. | 414/783 |
| 6,789,469 B1 * | 9/2004 | Tipton et al. | 100/4 |
| 7,331,267 B2 * | 2/2008 | Urmson | 83/651 |
| 7,351,019 B2 | 4/2008 | Bosker et al. | |
| 7,717,254 B2 * | 5/2010 | Brackley et al. | 198/836.3 |

FOREIGN PATENT DOCUMENTS

EP 0491631 A1 6/1992

OTHER PUBLICATIONS

Exhibit A: Website printout re AgriNomix Trimmers (undated but admitted to be prior art).
Exhibit B: Website printout re Transplant Systems (undated but admitted to be prior art).

* cited by examiner

*Primary Examiner* — Douglas Hess
(74) *Attorney, Agent, or Firm* — Waddey & Patterson, P.C.; Lucian Wayne Beavers

(57) ABSTRACT

A contour trimmer apparatus for potted plants includes a crank and connecting rod mechanism for moving a pair of transversely opposed pot engagement heads between open and closed positions. A gap between the pot engagement heads in their closed position may be adjusted via a lead screw arrangement which adjusts an operating position of the crank of the crank and connecting rod assembly.

12 Claims, 7 Drawing Sheets

US 8,025,141 B1

CONTOUR TRIMMER FOR POTTED PLANTS

BACKGROUND OF THE INVENTION

1. Field of the Invention

The present invention relates generally to contour trimmer apparatus for the automated trimming of potted plants.

2. Description of the Prior Art

A frequent task in a nursery is the trimming of potted plants into symmetrical shapes such as cone shaped, ball shaped etc. Such trimming is often done by hand which is a tedious and time consuming task.

There have been some prior attempts to automate this contour trimming operation. One such example is shown in U.S. Pat. No. 6,151,876 to Van Der Burg.

There is a continuing need for improvements in such automated contour trimming equipment.

SUMMARY OF THE INVENTION

According to a first aspect of the invention a contour trimmer apparatus for trimming potted plants includes a conveyor for conveying pots in a longitudinal direction, a longitudinal guide rail extending generally parallel to the longitudinal direction, and a transverse guide rail extending transverse to the longitudinal direction. First and second transversely opposed pot engagement heads are slidably disposed upon the transverse guide rail and are moveable between an open position wherein a pot may pass therebetween and a closed position wherein a pot may be grasped between the pot engagement heads. A first slide member is slidably received upon the longitudinal guide rail. A drive motor is mounted on the first slide member. A second slide member is slidably received upon the longitudinal guide rail between the first slide member and the transverse guide rail. First and second connecting arms are pivotally connected between the second slide member and the first and second pot engagement heads, respectively. A reciprocating mechanism connects the drive motor to the second slide member so that the drive motor drives the second slide member in a reciprocating motion upon the longitudinal guide rail which is in turn translated via the connecting arms into an opening and closing motion of the pot engagement heads upon the transverse guide rail.

In a second aspect of the invention a contour trimmer apparatus for trimming potted plants includes a conveyor and first and second pot engagement heads located on opposite sides of the conveyor. The pot engagement heads are moveable between an open position wherein a pot may pass therebetween and a closed position wherein a pot may be clamped between the engagement heads. The apparatus further includes a drive motor and a reciprocating mechanism assembly connecting the drive motor to the first and second pot engagement heads. The reciprocating mechanism assembly translates rotational motion of the drive motor into movement of the engagement heads between their open and closed positions. A manually adjustable positioning mechanism connected to the drive motor adjusts a position of the drive motor relative to the conveyor and thereby adjusts a gap between the engagement heads.

In a third aspect of the invention a method is provided for contour trimming of potted plants. The method includes steps of:

(a) moving a potted plant on a conveyor to a trimming position between two pot engagement heads;

(b) rotating a crank and connecting rod assembly with a drive motor and thereby moving the pot engagement heads toward each other and clamping the pot between the pot engagement heads;

(c) rotating the pot with the pot engagement heads and trimming the potted plant; and (d) further rotating the crank and connecting rod assembly and thereby moving the engagement heads away from each other and releasing the pot.

Numerous objects, features, and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
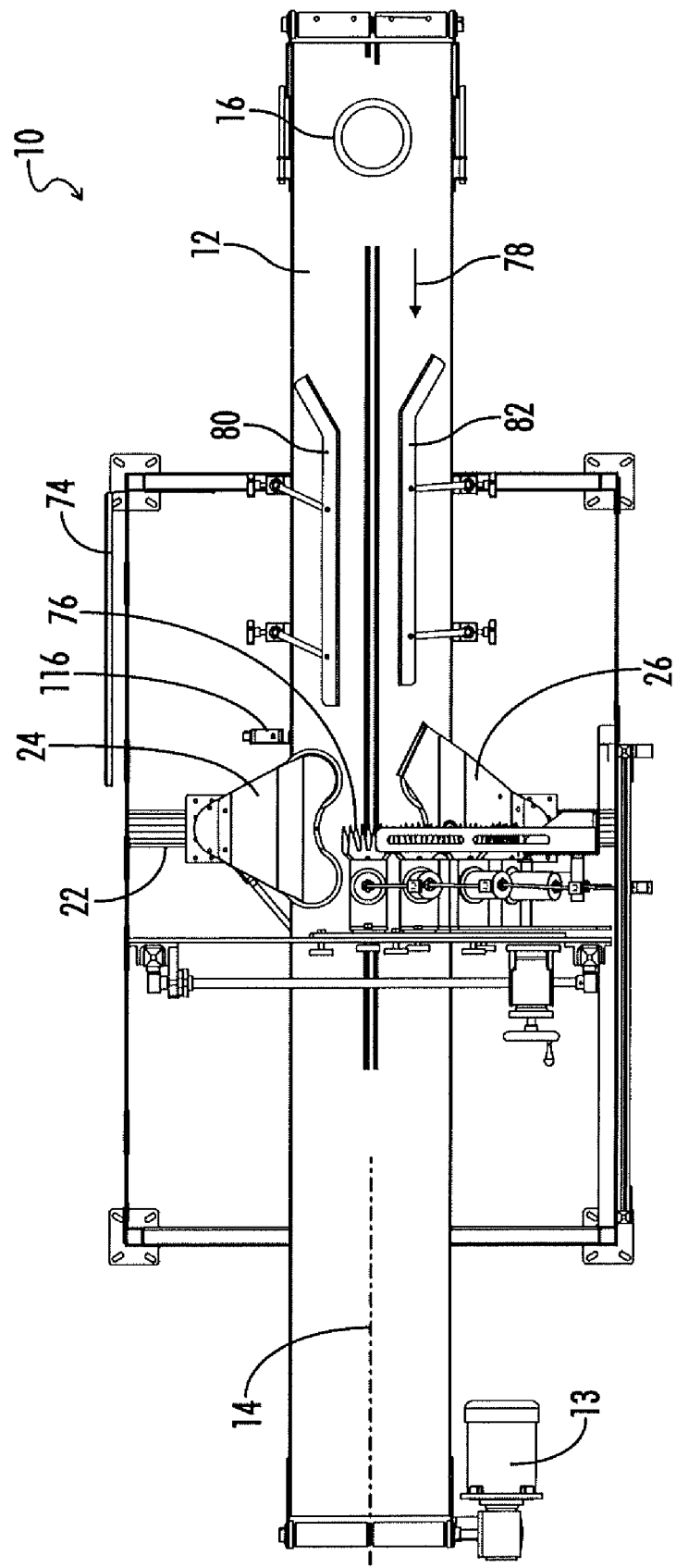
FIG. 1 is a plan view of the contour trimmer apparatus.
Figure 2:
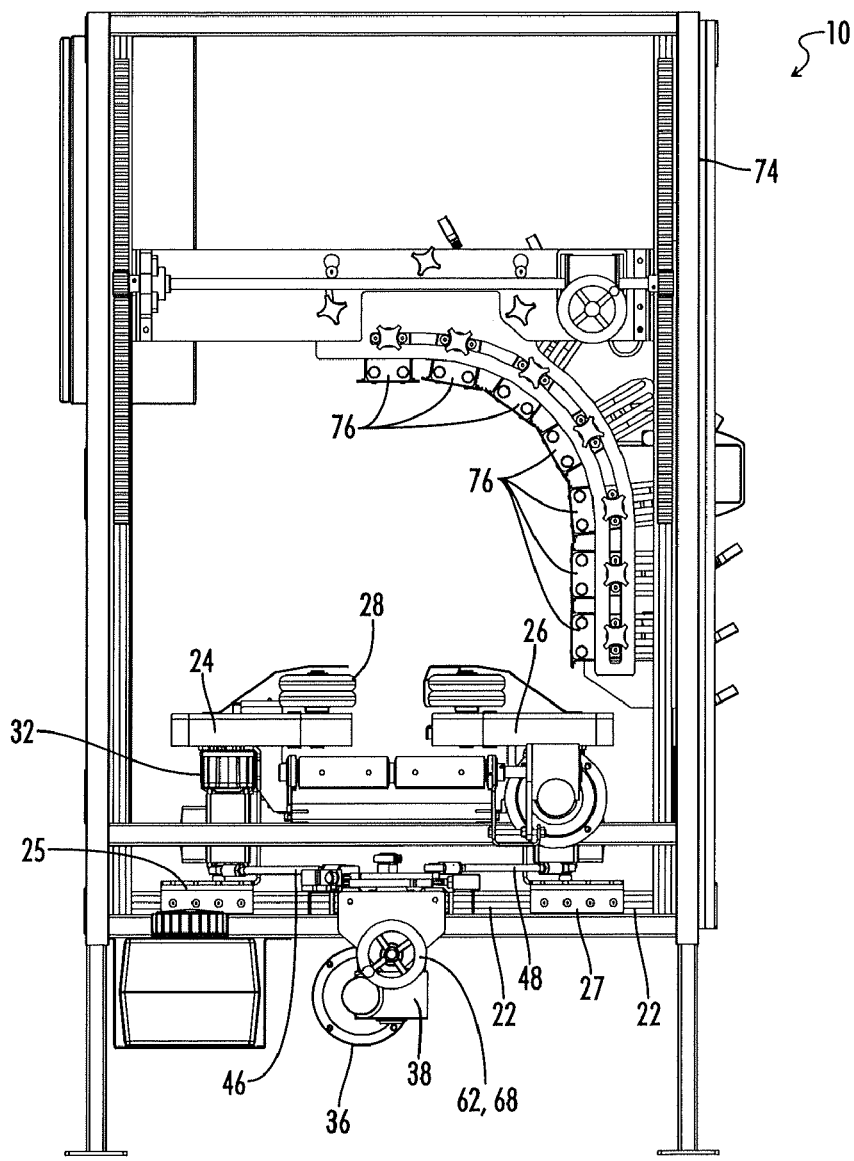
FIG. 2 is a left end elevation view of the apparatus of FIG. 1.

Referring now to the drawings and particularly to FIGS. 1 and 2, the contour trimmer apparatus is shown and generally designated by the numeral 10. The apparatus 10 includes a conveyor 12 having a longitudinal axis 14. Conveyor 12 is powered by a conveyor drive motor 13. A pot 16 is shown in place upon the conveyor 12 and is moved by the conveyor 12 in a longitudinal direction from right to left as seen in FIG. 1.

Figure 3:
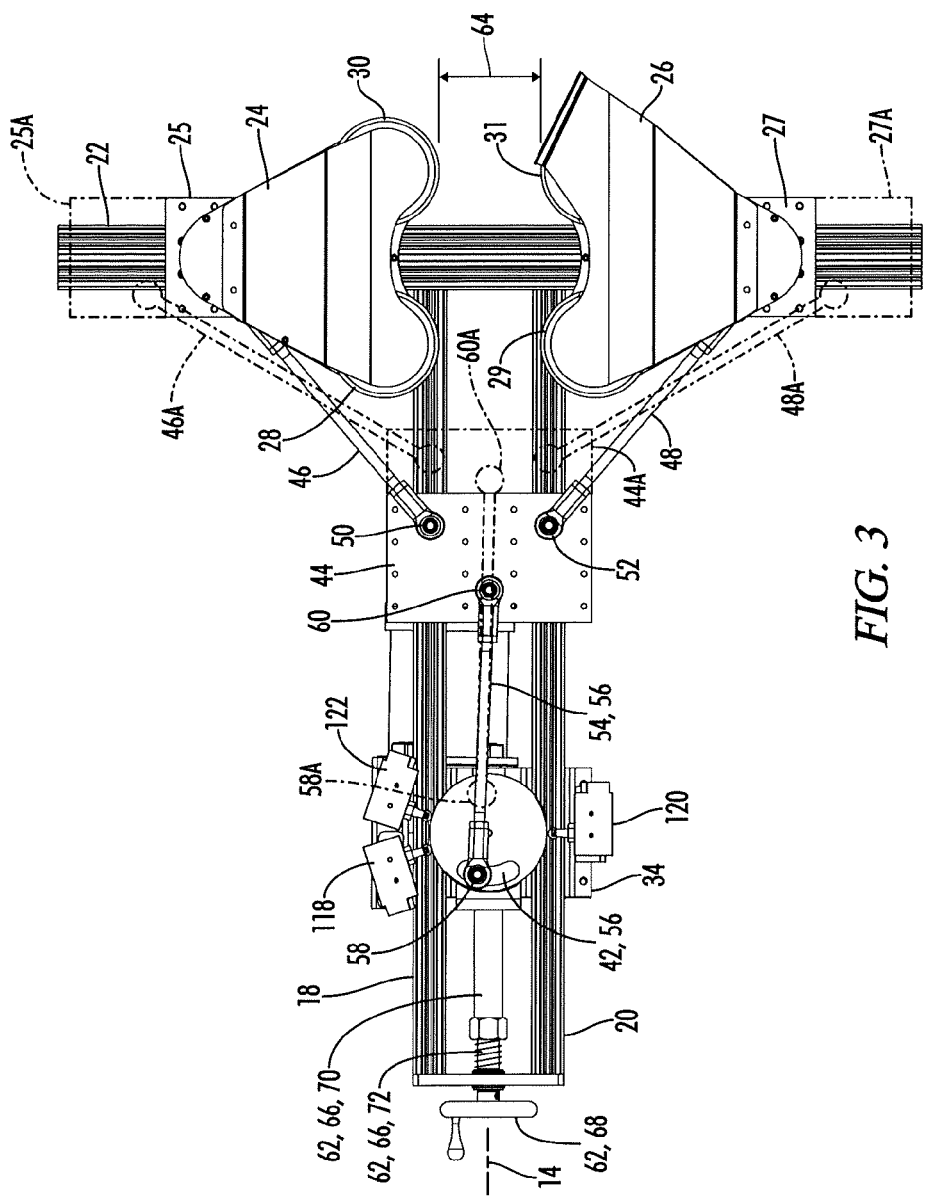
FIG. 3 is a plan view of the longitudinal and transverse guide rails with the various slide blocks and pot engagement head adjusting mechanism mounted thereon.

As best seen in FIG. 3, first and second longitudinal guide rails 18 and 20 are mounted on the apparatus 10 below the conveyor 12 and extend generally parallel to the longitudinal direction 14. Additionally, a transverse guide rail 22 is attached to the apparatus 10 and extends transverse to the longitudinal axis 14, which may also be referred to as the longitudinal direction 14.

First and second transversely opposed pot engagement heads 24 and 26 are slidably disposed upon the transverse guide rail 22 and moveable between an open position wherein the pot 16 can pass therebetween and a closed position as shown in FIGS. 1 and 3 wherein the pot 16 can be grasped between the pot engagement heads 24 and 26. The first and second pot engagement heads 24 and 26 are mounted upon transverse slide blocks 25 and 27, respectively, which are each slidably mounted upon the transverse guide rail 22.

Figure 4:
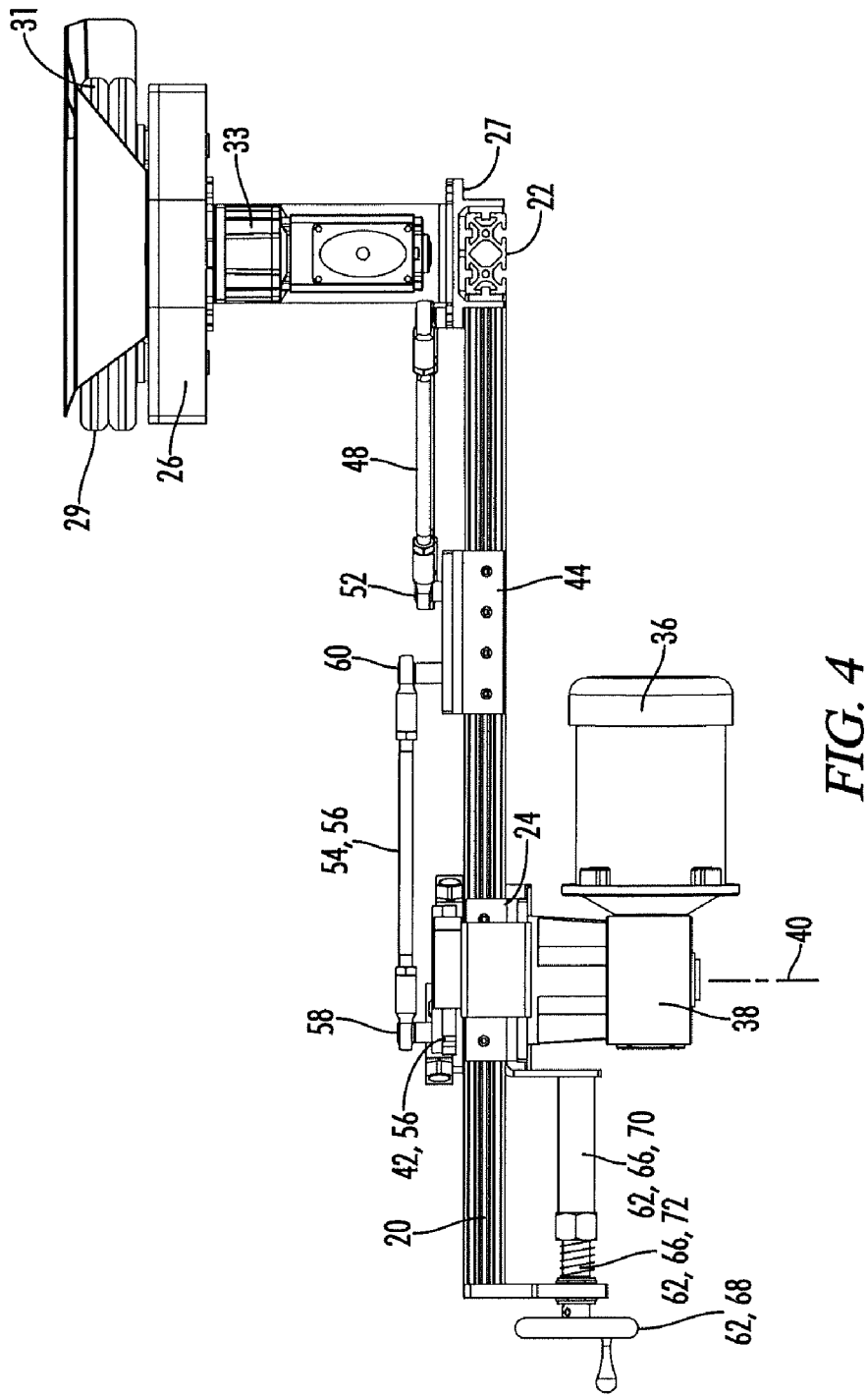
FIG. 4 is a front elevation view of the apparatus of FIG. 3.

At least one and preferably both of the pot engagement heads 24 and 26 include a power drive for rotating the pot 16. The power drive for engagement head 24 includes a pair of rollers 28 and 30 and a roller drive motor 32 (see FIG. 2) for driving the rollers 28 and 30 via an appropriate drive system such as gears, belts and pulleys, or drive chains and sprockets. Similarly engagement head 26 may have rollers 29 and 31 and a roller drive motor 33 as seen in FIG. 4.

A first slide member 34 is slidably received upon the longitudinal guide rails 18 and 20. A primary drive motor 36 and a right angle gear reducer 38 are attached to the first slide member 34 for movement therewith upon the longitudinal guide rails 18 and 20. An output shaft (not shown) of the gear reducer 38 extends vertically upward along a central axis 40.

A crank plate assembly 42 is attached to the upper end of the output shaft of gear reducer 38 and is rotated by the drive motor 36 and gear reducer 38.

A second slide member or slide block 44 is slidably received upon the longitudinal guide rails 18 and 20 between the first slide member 34 and the transverse guide rail 22. First and second connecting arms 46 and 48 are connected between the second slide block 44 and the first and second transverse slide blocks 25 and 27 and thus to the first and second pot engagement heads 24 and 26, respectively. Each of the connecting arms 28 and 30 has a first end pivotally attached to the second slide block 44 at pivotal connections 50 and 52, respectively. Each of the connecting arms 46 and 48 has a second end similarly pivotally connected to the first and second transverse slide blocks 25 and 27, respectively.

A connecting rod 54 has a first end pivotally connected at 58 to the crank plate assembly 42 and a second end pivotally connected at 60 to the second slide block 44. As the crank plate assembly 42 is rotated by the drive motor 36, the second slide member 44 is reciprocated left and right as seen in FIGS. 1 and 3 upon the longitudinal guide rails 18 and 20.

The crank plate assembly 42 and connecting rod 54 may be collectively described as a reciprocating mechanism 56 connecting the drive motor 36 to the second slide member 44 so that the drive motor 36 drives the second slide member 44 in a reciprocating motion upon the longitudinal guide rails 18 and 20, which reciprocating motion is in turn translated via the connecting arms 46 and 48 into an opening and closing motion of the pot engagement heads 24 and 26 upon the transverse guide rail 22.

The closed position of the engagement heads 24 and 26 and corresponding position of crank plate assembly 42 and connecting rod 54 and second block 44 are shown in solid lines in FIG. 3.

To move the engagement heads 24 and 26 to their open position, the crank plate assembly 42 rotates about vertical axis 40 through an angle of 180° thus moving the first pivotal end of the connecting rod 54 to the second position 58A as shown in phantom lines. The corresponding position of the second end 60 of connecting rod 54 is indicated in phantom lines as 60A and the corresponding position of the second block 44 when the engagement heads are in their open position is shown in phantom lines as 44A. The corresponding positions of connecting arms 46 and 48 and transverse slide blocks 25 and 27 are also shown in phantom lines corresponding to the open position of engagement heads 24 and 26, and those phantom line positions are denoted by the suffix A.

A manually adjustable positioning mechanism 62 is attached to the first slide member 34 and adjustable to adjust the position of the first slide member 44 upon the longitudinal guide rails 18 and 20 and to thereby adjust a corresponding gap 64 between the first and second pot engagement heads 24 and 26. The positioning mechanism 62 includes a lead screw 66 extending generally parallel to the longitudinal guide rails 18 and 20 and a handle 68 for rotating the lead screw 66. The lead screw 66 includes an internally threaded cylindrical part 70 fixed to the first slide block 34 and an externally threaded member 72 attached to the handle 68 for rotation therewith. Member 72 is threadedly received within member 70.

During operation of the apparatus 10 the first slide block 34 is fixed in position longitudinally relative to the longitudinal guide rails 18 and 20. When it is desired to adjust the gap 64 between the engagement heads 24 and 26, the handle 68 is rotated in either direction to move the first slide block 34 either left or right as seen in FIG. 3 relative to the guide rails 18 and 20 and thus to either reduce or enlarge the gap 64 between the engagement heads 24 and 26. As is further explained below, this allows for adjustment of the gap 64 to allow the apparatus 10 to handle pots 16 of different sizes and outside diameters.

As seen in FIGS. 1 and 2, the apparatus 10 includes a framework 74 in which the conveyor 12 and guide rails 18, 20 and 22 are mounted.

A plurality of trimmer heads 76 are attached to the framework 74 above the engagement heads 24 and 26 for trimming a plant contained in the pot 16 when the pot 16 is held in place between the engagement heads 24 and 26 and the pot is rotated to rotate the plant relative to the cutting head 76.

Operation of the Apparatus

The apparatus 10 is generally operated in the following manner. A pot 16 containing a plant is placed on the conveyor belt 12 in a position such as shown in FIG. 1. Initially, the engagement heads 24 and 26 would be in their open positions corresponding to the phantom line positions of transfer slide blocks 25A and 27A shown in FIG. 3. The conveyor 12 is turned on and moves from right to left as seen in FIG. 1 in the direction of arrow 78 until the pot 16 reaches a position located directly between the engagement heads 24 and 26 at which time the conveyor belt 12 is stopped. Adjustable guide channels 80 and 82 are used to direct the pot 16 through the middle portion of the conveyor 12. The position of the pot 16 between the engagement heads 24 and 26 may be referred to as a trimming position.

Then the engagement heads 24 and 26 are moved toward each other to clamp the pot 16 therebetween. This is accomplished by rotating the crank plate assembly 42 with the drive motor 36 and thus moving the connecting rod 54 from its phantom line position shown in FIG. 3 to its solid line position as shown in FIG. 3 thus moving the engagement heads 24 and 26 to their closed solid line positions as shown in FIGS. 1 and 3. If the gap 64 between the engagement heads 24 and 26 has been properly adjusted, as further described below, the engagement heads 24 and 26 will snugly engage the pot 16.

Then, the roller drive motors 32 and 33 are operated to rotate the drive rollers 28, 29, 30 and 31 of the first and second engagement heads 24 and 26 so as to rotate the pot 16 through at least 360°, and preferably slightly more than 360°, while the trimmer heads 76 are operating so that the plant contained within the pot 16 is trimmed to a profile corresponding to the location of the trimmer heads 76. While the pot 16 is being rotated, the conveyor 12 remains off, and the crank 42 and connecting rod 54 remain stationary in their solid line positions as seen in FIG. 3.

After the plant has been trimmed, the crank 42 is again rotated through 180° to move the connecting rod 54, second slide block 44, and transverse slide blocks 25 and 27 back to their phantom line positions shown in FIG. 3 corresponding to the open position of the pot engagement heads 24 and 26, thus releasing the pot 16. The conveyor 12 is then turned on again to move the pot 16 further to the left out of the trimming position, and simultaneously another pot 16 and plant can be moving into the trimming position.

Each time the apparatus 10 is set up for use with a particular size of pot, it will be desirable to adjust the gap 64 between the engagement heads 24 and 26 so that the engagement heads 24 and 26 snugly engage the pot 16. This can be accomplished via the lead screw 66 which adjusts a position of the first slide block 34 and thus of the drive motor 36 relative to the conveyor 12 thereby adjusting the gap 64.

Figure 5:
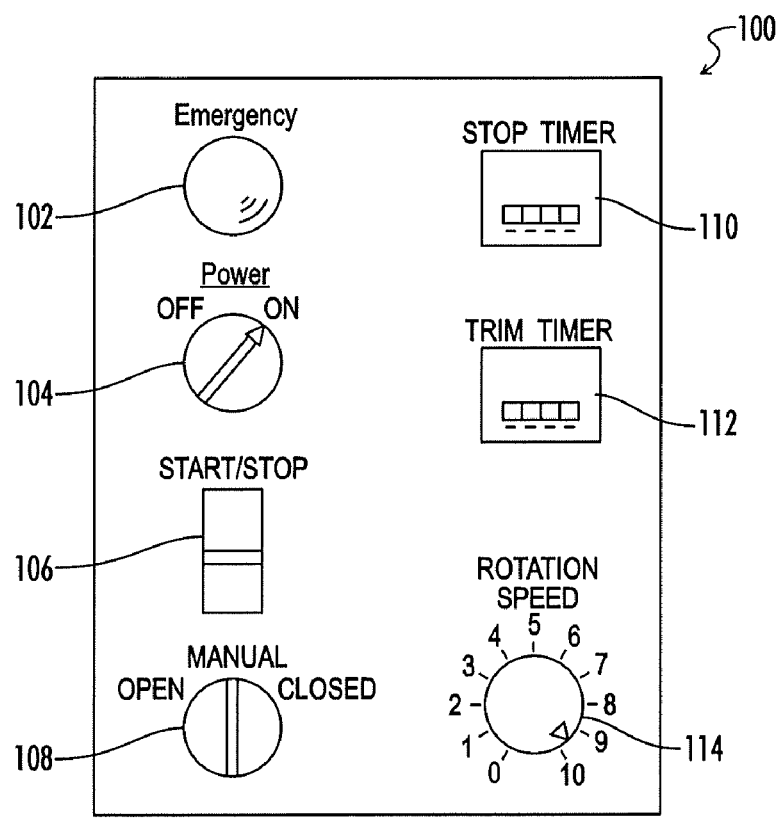
FIG. 5 is a front view of a control panel.

The operational steps described above are carried out under the control of a suitable control system which will use a series of position sensors, timers and switching controls to operate the various drive motors 13, 36, 32 and 33 at the appropriate times. FIG. 5 illustrates a control panel 100 which controls this operation. Control panel 100 includes an emergency off button 102, a power on/off switch 104, a start/stop switch 106, a manual open closed switch 108, a stop timer 110, a trim timer 112 and a rotation speed control 114.

Control panel 100 works in combination with a photo eye 116 (see FIG. 1) and three position switches 118, 120 and 122 that are associated with upper and lower cam plates 124 and 126 of crank plate assembly 42. Lower cam plate 124 is fixed relative to the output shaft of gear reducer 38 by a spline received in groove 125. End 58 of arm 56 is pivotally attached to lower cam plate 124. End 58 extends through an arcuate slot 127 in upper cam plate 126, which allows for an adjustment of the relative timing of actions controlled by upper and lower cam plates 124 and 126 as further described below. Those controls work as follows.

Assuming the apparatus 10 has been previously set up for proper operation, the power switch 104 is turned on, and the start switch 106 is engaged to start automatic operation. This turns on the conveyor 12.

Figure 6:
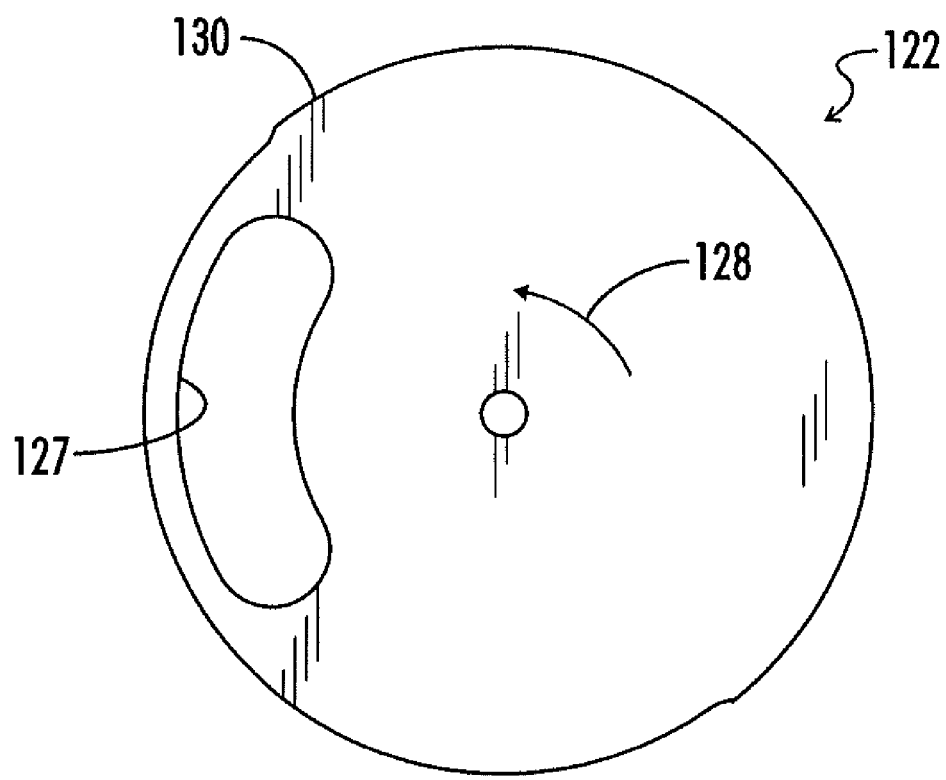
FIG. 6 is a plan view of an upper cam plate.
Figure 7:
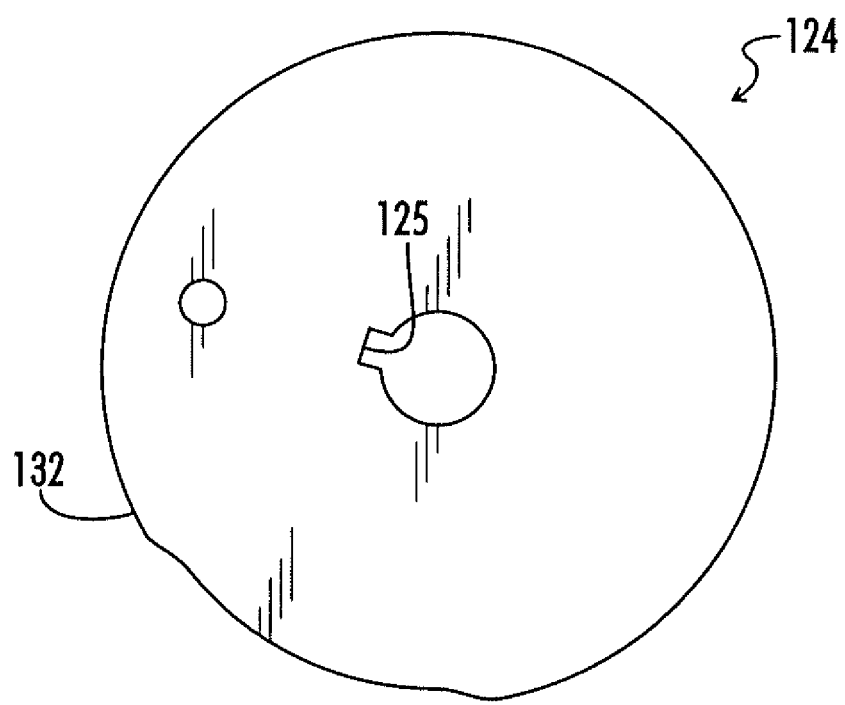
FIG. 7 is a plan view of a lower cam plate.

To describe one full cycle of operation, initially the engagement heads 24 and 26 would be in their open positions corresponding to the phantom line positions of transfer slide blocks 25A and 27A shown in FIG. 3. As the conveyor 12 moves the pot 16 from right to left the pot 16 trips the photo eye 116. Photo eye 116 starts the stop timer 110 which turns on the trimmers 76 and allows the conveyor to continue to run for a preset time until the pot 16 stops at the trimming position. By adjusting the timer 110 the trimming position can be adjusted for different size pots. When the timer 110 times out it stops conveyor 12, and starts the drive motor 36 rotating to turn the crank plate assembly 42 counterclockwise as indicated by arrow 128 in FIG. 6. The crank plate assembly 42 rotates through approximately 180 degrees to a fully closed position at which point first switch 118 runs up onto cam surface 130 of upper cam plate 122 thus signaling that the apparatus 10 is in the fully closed solid line position of FIG. 3, with the pot 16 snugly engaged by heads 24 and 26. First switch 118 turns off drive motor 36, and turns on the roller drive motors 32 and 33 of heads 24 and 26 to rotate the pot relative to the trimmers 76. The trim timer 112 and rotation speed control 114 control the time of the trimming operation and the speed of rotation of the pot; preferably they are set to achieve a rotation of about 370 degrees of the pot 16 relative to the trimmers 76. In any event it will be appreciated that the pot 16 must be rotated at least 360 degrees.

When the trim timer 112 times out it turns off the trimmers 76 and tells the drive motor 36 to turn on again and further rotate the crank plate assemble 42 counterclockwise. After about 50-60 degrees rotation the second switch 118 will ride up on cam surface 132 of upper cam plate 122 thus signaling that the heads 24 and 26 are far enough open that the pot 16 has been released, and that signal turns the conveyor 12 back on so the pot 16 begins moving to the left again out of the trim position. Third switch 122 will later also engage cam surface 132 to detect when the apparatus 10 is again in the fully open phantom line position of FIG. 3 and will then turn the drive motor 32 off, and the cycle repeats.

In the event of emergency, the system can be shut down by pressing the emergency off button 102.

The manual open/closed switch 108 is used for setting up the system 10 and particularly for adjusting the gap 64 in the fully closed position so that the engagement heads 24 and 26 can snugly engage pots of different sizes. By moving switch 108 to the manual closed position the engagement heads 24 and 26 will cycle to their solid line fully closed position of FIG. 3. Then the handle 68 is turned until the gap 64 is large enough that a pot 16 can be placed in the trimming position.

Then the handle 68 is turned back until engagement heads 24 and 26 touch the pot. The handle 68 should then be turned approximately an additional one-quarter turn so that the pot is snugly engaged. It will be understood that the pots 16 may be flexible, such as a plastic pot, and thus may flex slightly when snugly engaged. Now the system is set up for use on the selected pot size.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A contour trimmer apparatus for trimming potted plants, comprising:
   a conveyor for conveying pots in a longitudinal direction;
   a longitudinal guide rail extending generally parallel to the longitudinal direction;
   a transverse guide rail extending transverse to the longitudinal direction;
   first and second transversely opposed pot engagement heads slidably disposed upon the transverse guide rail and movable between an open position wherein a pot can pass therebetween and a closed position wherein a pot can be grasped between the pot engagement heads, at least one of the engagement heads including a head power drive for rotating a pot held between the engagement heads;
   a first slide member slidably received upon the longitudinal guide rail;
   a drive motor mounted on the first slide member;
   a second slide member slidably received upon the longitudinal guide rail between the first slide member and the transverse guide rail;
   first and second connecting arms, each arm including a first end pivotally attached to the second slide member and a second end pivotally connected to the first and second pot engagement heads, respectively; and
   a reciprocating mechanism connecting the drive motor to the second slide member so that the drive motor drives the second slide member in a reciprocating motion upon the longitudinal guide rail which is in turn translated via the connecting arms into an opening and closing motion of the pot engagement heads upon the transverse guide rail.

2. The apparatus of claim 1 wherein:
   the reciprocating mechanism includes a crank rotated by the drive motor, and a connecting rod pivotally connected at one end to the crank and at the other end to the second slide member so that as the crank is rotated by the drive motor the second slide member is reciprocated upon the longitudinal guide rail.

3. The apparatus of claim 1, further comprising:
   a manually adjustable positioning mechanism attached to the first slide member and adjustable to adjust a position of the first slide member upon the longitudinal guide rail and to thereby adjust a corresponding gap between the first and second pot engagement heads.

4. The apparatus of claim 3, wherein:
   the manually adjustable positioning mechanism includes a lead screw extending generally parallel to the longitudinal guide rail, and a handle for rotating the lead screw.

5. A contour trimmer apparatus for trimming potted plants, comprising:
- a conveyor;
- first and second pot engagement heads located on opposite sides of the conveyor, the engagement heads being movable between an open position wherein a pot may pass therebetween and a closed position wherein a pot may be clamped between the engagement heads;
- a drive motor;
- a reciprocating mechanism assembly connecting the drive motor to the first and second pot engagement heads, the reciprocating mechanism assembly translating rotational motion of the drive motor into movement of the engagement heads between their open and closed positions; and
- a manually adjustable positioning mechanism connected to the drive motor for adjusting a position of the drive motor relative to the conveyor and thereby adjusting a gap between the engagement heads.

6. The apparatus of claim 5, wherein the reciprocating mechanism assembly comprises:
- a longitudinal guide rail, the drive motor being slidably mounted upon the longitudinal guide rail;
- a slide block slidably mounted on the longitudinal guide rail;
- a crank rotated by the drive motor;
- a connecting rod pivotally connected to the crank and to the slide block; and
- first and second connecting arms pivotally connected to the slide block and to the first and second engagement heads, respectively.

7. The apparatus of claim 6, further comprising:
- a transverse guide rail, the pot engagement heads being slidably mounted on the transverse guide rail.

8. The apparatus of claim 5, wherein:
- the manually adjustable positioning mechanism includes a lead screw connected to the drive motor extending generally parallel to a longitudinal axis of the conveyor, and a handle for rotating the lead screw.

9. A method of contour trimming potted plants, comprising:
- (a) moving a potted plant on a conveyor to a trimming position between two pot engagement heads;
- (b) rotating an eccentric crank and a reciprocating connecting rod assembly with a drive motor and thereby moving the pot engagement heads toward each other and clamping the pot between the pot engagement heads;
- (c) rotating the pot with the pot engagement heads and trimming the potted plant; and
- (d) further rotating the eccentric crank and reciprocating connecting rod assembly and thereby moving the engagement heads away from each other and releasing the pot.

10. The method of claim 9, further comprising:
- adjusting a position of the drive motor relative to the conveyor and thereby adjusting a gap between the engagement heads.

11. The method of claim 10, wherein:
- the adjusting step comprises sliding the drive motor along a longitudinal guide rail extending generally parallel to a direction of motion of the conveyor.

12. The method of claim 9, wherein:
- step (b) further comprises:
- sliding a slide block connected to the connecting rod along a longitudinal guide rail extending generally parallel to a direction of motion of the conveyor; and translating longitudinal motion of the slide block into transverse motion of the engagement heads via a pair of connecting arms each pivotally connected at one end to the slide block and at another end to one of the engagement heads.

\* \* \* \* \*